United States Patent Office 3,410,769
Patented Nov. 12, 1968

3,410,769
ELECTROLYTIC REDUCTIVE COUPLING
OF AZOMETHINES
Manuel M. Baizer, St. Louis, Mo., assignor to Monsanto
Company, St. Louis, Mo., a corporation of Delaware
No Drawing. Filed Jan. 4, 1965, Ser. No. 423,342
9 Claims. (Cl. 204—74)

The present invention relates to the electrolytic reductive coupling of azomethines. The present invention is concerned with the electrolytic hydrodimerization of azomethines to produce saturated dimers. The present invention is further concerned with the electrolytic reductive coupling of azomethines with compounds containing activated olefinic bonds.

The hydrodimerization according to the present invention can be illustrated:

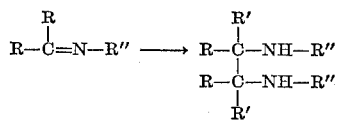

in which R and R′ are monovalent moieties or hydrogen and R″ is a monovalent moiety.

The present process involves electrolysis or electroreducible azomethines in aqueous solutions of supporting electrolyte salts. The supporting electrolyte salts are less subject to reduction at the cathode than the azomethine being electrolyzed. It is preferred to utilize azomethines which do not require extremely negative cathode voltages, particularly those azomethines reduced at cathode voltages no less negative than —2.4 cathode volts, or more preferably, no less negative than —2.0 cathode volts, the cathode volts being vs. a saturated calomel electrode, as measured with a mercury cathode and in concentrated aqueous solution of quaternary ammonium salt. Azomethines containing electron-withdrawing groups on the nitrogen atom tend to be fairly readily reducible and can be suitably employed, the electron-withdrawing groups being, for example, carboxyl, cyano, carboxamido, phosphonato, phosphinato, sulfonyl, o- or p-pyridyl, etc. Aryl groups, such as phenyl and naphthyl groups are also suitable, and such groups can have various substituents, being strictly hydrocarbon as with alkyl substituents, or having various other substituents such as halogens, alkoxy groups, hydroxyl, amino groups, cyano groups, carboxylato groups etc. The presence of certain substituents on the aryl ring in ortho- or para-position to the nitrogen is actually beneficial in making the azomethine double bond reducible at less negative voltages, such groups being electron-withdrawing groups which are classified as meta-directing groups, e.g. cyano groups, acyl groups, carboxylato groups, etc. In general it is preferred that any substituents not be reducible at less negative voltages than the azomethine double bond, as the more readily reducible group would then be reduced before the desired reductive coupling occurred. However, after any more readily reducible group has been reduced, the reaction at the electroreducible double bond of the azomethine can still occur to produce a reduced, coupled product corresponding to that which would usually result from the starting materials except that the readily reducible group has also been reduced. Any of the foregoing substituents can be utilized as R″ in the formulae of the illustrative reaction hereinabove.

Any of the foregoing groups can also be present as a substituent on the carbon atom of the azomethine double bond, for example as R or R′ in the formulae of the reaction illustrated hereinabove, and the use of electron withdrawing groups as such substituent is also advantageous, although possibly not as significant as the use of such groups as a substituent on the nitrogen. If the substituent on the carbon atom is an alkyl group, alkoxy group, or other electron-donating group, it will be advantageous to have a strongly electron-withdrawing group as the substituent on the nitrogen for the purpose of making the double bond readily reducible by electrolysis. Frequently the azomethine will carry at least one hydrogen, and the foregoing disclosure includes disclosure of reactions of azomethines illustrated by the formulae hereinabove in which R is hydrogen and R′ and R″ are any combinations of any of the foregoing disclosed groups. Further specific examples of azomethines which can be reductively coupled in accordance with the procedures of the present invention include:

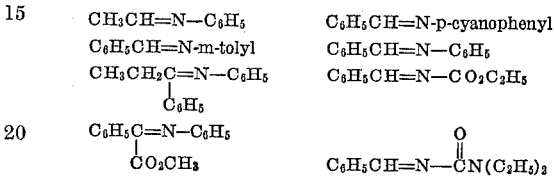

The azomethines disclosed herein can be used in electrolytic reductive coupling reactions with themselves, i.e. electrolytic hydrodimerizations, or in electrolytic reductive couplings with other activated olefinic compounds amenable to electrolytic reductive coupling.

The azomethines utilized herein will be reducible at cathode voltages less negative than those at which the supporting electrolyte is reduced. In practice such voltages will vary somewhat with the cathode material and other electrolysis conditions and it will be understood that the required potentials will exist at the conditions employed. However, the half-wave potential is a useful measure of such potentials under standard conditions, the half-wave potential being a property determinable polarographically and described in Kirk and Othmer, Encyclopedia of Chemical Technology, vol. 10, pages 886 to 890. The half-wave potential is the inflection point of a current-potential diagram and is expressed as voltage with reference to an auxiliary saturated calomel electrode.

The azomethines can be electrolytically cross-coupled with activated olefins which are hydrodimerizable, olefins being those which have the olefinic group in α,β-position with respect to electron-withdrawing groups, such as carboxyl, cyano, carboxamide, phosphonato, phosphinato, sulfonyl, o- or p-pyridyl, etc. groups. Such cross-coupling reactions will generally occur most efficiently when the azomethine is more readily reduced than the olefinic compound and serves as a donor molecule, while the olefinic compound serves as the acceptor molecule. Such reaction can be pictured as involving an uptake of two electrons by the azomethine which then joins with the β-acceptor molecule at the β-carbon thereof:

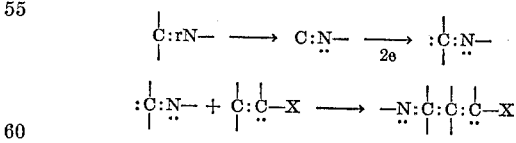

in which X represents an activating group. The coupled product is then protonated by the water to form:

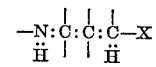

It will be recognized that the protonation of either or both of the reactants can also occur at an intermediate stage.

Suitable activated olefins for cross-coupling with azomethines according to the present invention includes α,β-olefinic carboxylates, carboxamides, nitriles, phosphonates, phosphinates, phosphine oxides, sulfones and 2- or 4-pyridines. Acrylonitrile is particularly notable for its general utility as an acceptor molecule in such cross-couplings. Specific examples of other activated olefins which can be used include ethyl acrylate, diethylacrylamide, diethyl vinylphosphonate, ethyl ethylvinylphosphinate, vinyl diethylphosphine oxide, vinyl methyl sulfone, etc. Various other suitable olefinic compounds for cross-coupling with azomethines are disclosed in my copending applications Ser. No. 333,647 filed Dec. 26, 1963 and now Patent No. 3,193,481, Ser. No. 337,540 filed Jan. 14, 1964 and now Patent No. 3,193,482, Ser. No. 337,546 filed Jan. 14, 1964 and now Patent No. 3,193,483 and Ser. No. 255,221 filed Jan. 31, 1963 and now Patent No. 3,249,521.

It will be realized that the cross-coupling reactions will be accompanied by varying amounts of hydrodimerization, depending upon the particular reactants involved and the conditions of electrolysis. The concomitant production of hydrodimerization products may be desirable as such products may be very useful. However, it will often be desired to direct the process toward preferential production of the coupled product. This can be done by regulating the cell voltage so that the electrolysis occurs at a cathode potential close to that for reduction of the monomer requiring the lowest voltage, i.e. the least negative voltage. This is particularly effective if the voltage for the more readily reducible monomer is appreciably lower than that for the other monomer, for example, 0.3 volt or more below that for the other monomer. In such cases, if the electrolysis is conducted at a cathode potential just sufficiently higher than that required for the more easily reducible monomer to achieve a practical reaction rate, there is very little if any hydrodimerization of the more difficulty reducible monomer, and the products are those resulting from coupling of the two monomers, or hydrodimerization of the more easily reducible monomer. It is possible to minimize the hydrodimerization of the more easily reducible monomer by "swamping" the mixture with the other monomer, employing only enough of the easily reducible monomer to keep the cathode potential at a value near that for reduction of the easily reducible monomer. If may be desirable to utilize small amounts of the easily reducible monomer and continuously or incrementally add such monomer as it is used up. Further description of conditions for cross-couplings which are applicable here appear in my copending application Ser. No. 163,028, filed Dec. 29, 1961 and now Patent No. 3,193,476.

Hydrodimerizations of azomethines by electrolysis in accordance with the present invention involves a reaction in which the methine carbon atoms of two molecules are coupled together by a covalent bond and the nitrogen atoms have an additional hydrogen attached thereto. It will be recognized that with various azomethines and with various electrolysis conditions, the desired reaction will be accompanied by other reactions such as simple reduction of the double-bond, etc. In cases where the azomethine is readily reduced to an amine, the use of electrolysis solutions containing minimum amounts of water will generally improve the efficiency of the hydrodimerization. Many of the azomethines are also subject to hydrolytic attack to cause splitting into an aldehyde and an amine, and this reaction is often minimized by utilizing minimum amounts of water, relatively low temperature and non-acidic conditions.

In general, the electrolytic reductive coupling of the present invention is conducted in concentrated solution in an aqueous electrolyte. It is desirable to employ fairly concentrated solutions in order to minimize undesired reactions of intermediate ions with the water of the electrolyte. The unsaturated reactants to be coupled will ordinarily comprise a least about 10% by weight of the electrolyte, and preferably at least 20% by weight or more. It is generally desirable to employ fairly high concentrations of salts in the electrolyte, for example constituting 5% and usually 30% or more by weight of the total amount of salt and water in the electrolyte, in order to obtain the desired solubility of the reactants.

The salt concentration has an important bearing upon the results obtained. When the salts are hydrotropic, high concentrations contribute to solubility of the reactants, making it possible to utilize higher concentrations of the reactants. But beyond this, the concentration of salt cations in some way affects the course of the reaction and results in higher yields of reductively coupled product at the expense of simple reduction products. The process of the present invention is carried out utilizing a supporting electrolyte as understood by those in the art, i.e., electrolyte capable of carrying current but not discharging under the electrolysis conditions, but with the requirement that the supporting electrolyte be a salt. As a practical matter the supporting electrolyte salt should constitue at least 5% by weight of the solution electrolyzed. The requirements of supporting electrolytes are well understood by those skilled in the art and they will be able to select such electrolytes and utilize them in the proper concentrations in view of the teaching herein as to catholyte, and the teaching in the referred-to applications concerning hydrodimerizations $\alpha,\beta$-olefinic compounds, and salt concentrations essential to such hydrodimerizations. As the reductive coupling of benzal aniline, for example, proceeds at cathode voltages which can vary from, say, about $-1.45$ to $-1.55$ (vs. saturated calomel electrode) depending somewhat upon conditions, any electrolyte salts not subject to substantial discharge at less negative conditions can be employed. Thus, extensive classes of suitable electrolyte salts are available for use. The salts can be organic or inorganic, or mixtures of such, and composed of simple cations and anions or very large complex cations and anions. The term "salts" is employed herein in its generally recognized sense to indicate a compound of a cation and an anion, such as produced by reaction of an acid with a base.

It is preferred that the salts employed herein have the properties of that class of salts recognized as "hydrotropic," i.e., as promoting the solubility of organic compounds in water. Various organic sulfonates, alkyl sulfates, etc., have hydrotropic effects. In this application, any salt which increases the solubility of the olefinic reactants in water is considered hydrotropic.

Some unsaturated compounds are subject to polymerization or other side reactions if the electrolyte is acidic, or excessively alkaline, and it will be desirable in such cases to conduct the reductive coupling in solutions which are not overly acidic and also in some cases below a pH at which undesirable side reactions occur, e.g. below about 12. To minimize the possibility of polymerization, simple reduction of the olefinic bond and other side reactions, the pH can conveniently be maintained in the range of about 3 to about 12, preferably 6 to 9.5. In addition, when the catholyte during electrolysis is acidic, it will generally be advisable to conduct the electrolysis under conditions which inhibit polymerization of the reactants involved or in the presence of a polymerization inhibitor, for example, in an atmosphere containing sufficient oxygen to inhibit the polymerization in question, or in the presence of inhibitors effective for inhibiting free radical polymerization.

It will be realized that the use of supporting electrolyte salts as taught herein does not ordinarily cause any acidity sufficient to have a great effect upon results, so that consideration of means to counteract acid pH's are ordinarily unnecessary except when acid electrolytes are employed or acids are deliberately added to the catholyte.

In effecting the reductive coupling or hydrodimerizations of the present invention it is preferred to uti'ize a cathode having an overvoltage greater than that of copper and to subject to electrolysis in contact with such cathode a concentrated solution of the defined reactant compounds in an aqueous electrolyte under mildly alkaline conditions. It is understood that both the cathode and the anode will be in actual direct physical contact with electrolyte. In effecting the reductive couplings of the present invention, it is essential to obtain cathode potentials required for such couplings and therefore the salt employed should not contain cations which are discharged at numerically substantially lower, i.e., less negative, cathode potentials. It is desirable that the salt employed have a high degree of water solubility to permit use of very concentrated solutions, for concentrated salt solutions dissolve greater amounts of the organic reactants.

In addition to the foregoing considerations, a number of other factors are important in selecting salts suitable for good results. For example, it is undesirable that the salt cation form an insoluble hydroxide at the operating pH, or that it discharge on the cathode forming an alloy which substantially changes the hydrogen overvoltage and leads to poorer current efficiencies. The salt anion should not be lost by discharge at the anode with possible formation of by-products. If a cell containing a separating membrane is used, it is desirable to avoid types of anions which, in contact with hydrogen ions present in the anolyte chamber, would form insoluble acids and clog the pores of the membrane. Alternatively, the use of an ion exchange membrane effectively separates catholyte and anolyte and the use of different anions in the two chambers may minimize any difficulties a particular anion would cause in one of the chambers.

In general amine and quaternary ammonium salts are suitable for use in the present process. Certain salts of alkali and alkaline earth metals can also be employed to some extent, although they are more subject to interfering discharge at the cathode and the alkaline earth metal salts in general tend to have poor water solubility, making their use inadvisable.

In carrying out the process of this invention, a solution for electrolysis is prepared by adding the unsaturated organic reactants to an aqueous solution (preferably about 30% or more by weight) of the conducting salt to give a solution which ordinarily contains at least 5% by weight, based on the total weight of the solution, of the organic reactants in the dissolved state. Depending upon the quantity of salt present and the nature thereof, there may thus be obtained true solutions containing as much as 50% or more by weight of the organic reactants. The concentartion of organic reactants in the dissolved state is to some extent a function of salt concentration; however, at temperatures of above room temperature, i.e., at above, say, 35° C., less of the salt is required to obtain optimum concentration of dissolved organic reactants than is required at room temperature. In order to obtain high concentrations of the organic reactants in the electrolysis solution when the electrolysis is to be conducted at room temperature, the organic reactants are advantageously added to a saturated aqueous solution of the salt. When the electrolysis is to be conducted at a temperature of above room temperature, high concentrations of organic reactant can be attained with unsaturated solutions of the salt, i.e., the salt may be as low as 30% by weight of the electrolysis solution. Concentration of the organic reactant in the electrolysis solution may also be increased by using a mixture of water and a polar solvent, e.g. acetonitrile, dioxane, ethylene glycol, dimethylformamide, dimethylacetamide, ethanol or isopropanol, together with the aromatic salt.

During electrolysis in a divided cell, alkalinity increases in the catholyte. However, the anolyte becomes acidic. When a porous diaphragm is used to separate the catholyte from the anolyte, the alkalinity of the catholyte will depend upon the rate of diffusion of acid from the anolyte through the porous barrier. Control of alkalinity in the catholyte, when employing a diaphragm, may thus be realized by purposely leaking acid from the anolyte into the catholyte. It can also be achieved, of course, by extraneous addition to the catholyte of an acid material, e.g., glacial acetic acid, phosphoric acid or p-toluenesulfonic acid. Alkalinity may also be controlled, whether or not a diaphragm is used in the cell, by employing buffer systems of cations which will maintain the pH range while not reacting at the reaction conditions.

When a divided cell is employed, it will often be desirable to use an acid as the anolyte, any acid being suitable, particularly dilute mineral acids such as sulfuric or phosphoric acid. Hydrochloric acid can be employed but would have the disadvantage of generating chlorine at the anode, and of being more corrosive with respect to some anode materials. If desired, a salt solution can be used as anolyte, those useful as catholyte also being suitable as anolyte, although there are many other salt solutions suitable for such use. It will be recognized that the descriptions of the catholyte solutions herein apply to the solutions, regardless of whether they are in an undivided cell serving as both catholyte and anolyte, or are in the cathode-containing portion of a divided cell. Conversely, when a divided cell is employed, the various descriptions of the catholyte do not necessarily apply to the anolyte, as the reactant is not ordinarily present in the anolyte and the character of the anolyte is not of primary importance to the reductive coupling reaction which is occurring in the catholyte. As a practical matter, to obtain good yields in the operation of a continuous process over a matter of days or weeks, it may be necessary to employ a divided cell to avoid or minimize interfering reactions, such as resulting from generation of hydrogen ions at the anode or resulting in deposition of various salt materials on the anode. Moreover, many suitable catholyte salts are subject to degradation if permitted to contact the anode, making it advantageous to employ mineral acids as the anolyte in a divided cell.

Materials suitable for constructing the electrolysis cell employed in the present process are well known to those skilled in the art. The electrodes can be of any suitable cathode and anode material. The anode may be of virtually any conductor, although it will usually be advantageous to employ those that are relatively inert or attacked or corroded only slowly by the electrolytes; suitable anodes are, for example, platinum, carbon, gold, nickel, nickel silicide, Duriron, lead and lead-antimony and lead-copper alloys, and alloys of various of the foregoing and other metals.

Any suitable material can be employed as cathode, various metals and alloys being known to the art. It is generally advantageous to employ metals of fairly high hydrogen overvoltage in order to promote current efficiency and minimize generation of hydrogen during the electrolysis. In general it will be desirable to employ cathodes having overvoltages at least about as great as that of copper, as determined in a 2 N sulfuric acid solution at current density of 1 milliamp/square centimeter (Carman, Chemical Constitution and Properties of Engineering materials, Edward Arnold and Co., London, 1949, page 290). Suitable electrode materials include, for example, mercury, cadmium, tin, zinc, bismuth, lead, graphite, aluminum, nickel, etc., in general those of higher overvoltage being preferred, although those of lower hydrogen overvoltage can also be employed, even if they generation of hydrogen under the electrolysis conditions, as is the case with stainless steel and other electrodes of lower hydrogen overvoltage. It will be realized that overvoltage can vary with the type of surface and prior history of the metal as well as with other factors; therefore the term overvoltage as used herein with respect to copper as a gauge has reference to the overvoltage under the conditions of use in electrolysis.

Among the salts which can be employed according to the invention for obtaining the desired concentration of dissolved unsaturated reactant, the amine and quaternary ammonium salts are generally suitable, especially those of sulfonic and alkyl sulfuric acids. Such salts can be the saturated aliphatic amine salts or heterocyclic amine salts, e.g., the mono-, di- or trialkylamine salts, or the mono-, di- or trialkanolamine salts, or the piperidine, pyrrolidine or morpholine salts, e.g., the ethylamine, dimethylamine or triisopropylamine salts of various acids, especially various sulfonic acids. Especially preferred are aliphatic and heterocyclic quaternary ammonium salts, i.e., the tetraalkylammonium or the tetraalkanolammonium salts or mixed alkyl alkanol ammonium salts such as the alkyltrialkanolammonium, the dialkyldialkanolammonium, the alkanoltrialkylammonium or the N-heterocyclic N-alkyl ammonium salts of sulfonic or other suitable acids. The saturated aliphatic or heterocyclic quaternary ammonium cations in general have suitably high cathode discharge potentials for use in the present invention and readily form salts having suitably high water solubility with anions suitable for use in the electrolytes employed in the present invention. The saturated, aliphatic or heterocyclic quaternary ammonium salts are therefore in general well adapted to dissolving high amounts of unsaturated organic compounds in their aqueous solutions and to effecting reductive couplings of such compounds. It is understood, of course, that it is undesirable that the ammonium groups contain any reactive groups which might interfere to some extent with the reductive coupling reaction. In this connection it should be noted that aromatic unsaturation as such does not interfere as benzyl substituted ammonium cations can be employed; (as also can aryl sulfonate anions.)

Among the anions useful in the electrolytes, the aryl and alkaryl sulfonic acids are especially suitable, for example, salts of the following acids: benzenesulfonic acid, o-, m-, or p-toluenesulfonic acid, o-, m- or p-ethylbenzenesulfonic acid, o-, m- or p-cumenesulfonic acid o-, m- or p-tert-amylbenzenesulfonic acid, o-, m- or p-hexylbenzenesulfonic acid, o-xylene-4-sulfonic acid, p-xylene-2-sulfonic acid, m-xylene-4 or 5 sulfonic acid, mesitylene-2-sulfonic acid, durene-3-sulfonic acid, pentamethylbenzenesulfonic acid, o-dipropylbenzene-4-sulfonic acid, alpha- or beta-naphthalenesulfonic acid, o-, m- or p-biphenylsulfonic acid, and alpha-methyl-beta-naphthalenesulfonic acid. Alkali metal salts are useful in the present invention with certain limitations, and the alkali metal salts of such sulfonic acids can be employed, i.e., the sodium, potassium, lithium, cesium or rubidium salts such as sodium benzenesulfonate, potassium p-toluenesulfonate, lithium o-biphenylsulfonate, rubidium beta-naphthalenesulfonate, cesium p-ethylbenzenesulfonate, sodium o-xylene-3-sulfonate, or potassium pentamethylbenzenesulfonate. The salts of such sulfonic acids may also be the saturated, aliphatic amine or heterocyclic amine salts, e.g., the mono-, di- or trialkylamine salts, or the mono-, di- or trialkanolamine salts or the piperidine, pyrrolidine, or morpholine salts, e.g., the ethylamine, dimethylamine or triisopropylamine salt of benzenesulfonic acid or of o-, p- or m-toluenesulfonic acid; the isopropanolamine, dibutanolamine or triethanolamine salt of o-, p- or m-toluenesulfonic acid or of o-, p- or m-biphenylsulfonic acid, the piperidine salt of alpha- or beta-naphthalenesulfonic acid or of the cumenesulfonic acids; the pyrrolidine salt of o-, m- or p-amyl-benzenesulfonate; the morpholine salt of benzenesulfonic acid, of o-, m- or p-toluenesulfonic acid, or of alpha- or beta-naphthalenesulfonic acid, etc. In general, the sulfonates of any of the ammonium cations disclosed generically or specifically herein can be employed in the present invention. The aliphatic sulfonates are prepared by reaction of the correspondingly substituted ammonium hydroxide with the sulfonic acid or with an acyl halide thereof. For example, by reaction of a sulfonic acid such as p-toluenesulfonic acid with a tertaalkylammonium hydroxide such as tetraethylammonium hydroxide there is obtained tetraethylammonium p-toluenesulfonate, use of which in the presently provided process has been found to give very good results. Other presently useful quaternary ammonium sulfonates are, e.g., tetraethylammonium o-, or m-toluenesulfonate or benzenesulfonate; tetraethylammonium o-, m- or p-cumenesulfonate, or o-, m- or p-ethylbenzenesulfonate, tetramethylammonium benezenesulfonate, or o-, m- or p-toluenesulfonate; N,N-di-methylpiperidinium o-, m- or p-toluenesulfonate or o-, m- or p-biphenylsulfonate; tetrabutylammonium alpha- or beta-naphthalenesulfonate or o-, m- or p-toluenesulfonate; tetrapropylammonium o-, m- or p-amylbenzenesulfonate or alpha-ethyl-beta-naphthalenesulfonate; tetraethanolammonium o-, m- or p-cumene-sulfonate or o-, m- or p-toluenesulfonate; tetrabutanolammonium benzenesulfonate or p-xylene-3-sulfonate; tetrapentylammonium o-, m- or p-toluenesulfonate, or o-, m- or p-hexylbenzenesulfonate, tetrapentanolammonium p-cymene-3-sulfonate or benzene sulfonate; methyltriethylammonium o-, m- or p-toluenesulfonate or mesitylene-2-sulfonate; trimethylethylammonium o-xylene-4-sulfonate or o-, m- or p-toluenesulfonate; triethylpentylammonium alpha-or beta-naphthalenesulfonate or o-, m- or p-butylbenzenesulfonate, trimethylethanolammonium benzenesulfonate or o-, m- or p-toluenesulfonate; N,N-diethylpiperidinium or N-methylpyrrolidinium, o-, m- or p-hexylbenzenesulfonate or o-, m- or p-toluenesulfonate, N,N-di-isopropyl or N,N-di-butyl-morpholinium, o-, m- or p-toluenesulfonate or o-, m- or p-biphenylsulfonate, etc.

The tetraalkylammonium salts of the aryl or alkarylsulfonic acids are generally preferred for use as the salt constituents of the electrolysis solution because the electrolyses in the tetraalkylammonium sulfonates are exclusively electrochemical processes.

Tetraethylammonium p-toluenesulfonate is particularly valuable as the salt constituent of the electrolysis solution in the presently provided hydrodimerization process. However, I have also found that the tetraethylammonium p-toluenesulfonate as well as the other tetraalkylammoniums, aryl or alkaryl sulfonates herein disclosed are of general utility in electrolytic reduction processes. The present invention thus provides generally an electrolytic reduction process comprising submitting to electrolysis an aqueous solution of a reducible compound and a tetraalkylammonium salt of a sulfonic acid selected from the class consisting of aromatic, aliphatic and aliphatic-aromatic sulfonic acids having from 1 to 6 carbon atoms in each alkyl radical and from 6 to 12 carbon atoms in the acid portion of the molecule.

Another especially suitable class of salts for use in the present invention are the alkylsulfate salts such as methosulfate salts and ethyl sulfate salts, particularly the amine and quaternary ammonium methosulfate and ethyl sulfate salts. Methosulfate salts such as the methyltriethylammonium, tri-n-propylmethylammonium, triamylmethylammonium, tri-n-butylmethylammonium, etc., are very hygroscopic and the tri-n-butylmethylammonium in particular forms very concentrated aqueous solutions which dissolve large amounts of organic materials. In general the amine and ammonium cations suitable for use in the alkylsulfate salts are the same as those for the sulfonates, e.g., tetraethylammonium methylsulfate and tetraethylammonium ethylsulfate are very suitable.

Aside from their advantageous properties, suitable methosulfates are readily prepared by reacting ethanolic solutions of dimethylsulfate with trialkyl amines, thereby producing methyltrialkylammonium methosulfates.

Various other cations are suitable for use in the present invention, e.g., tetraalkylphosphonium and trialkyl sulfonium cations, particularly as sulfonate salts formed from sulfonic acids as described above, or as methosulfate salts.

As a further illustration of electrolytes suitable for use in the present invention, the following salts are given by way of example.

(1) N-trimethyl-N'-trimethylethylenediammonium di-p-toluenesulfonate
(2) Benzyltrimethylammonium p-toluenesulfonate (3) Methyltri-n-butylphosphonium p-toluenesulfonate
(4) Tetraethylammonium sulfate
(5) Di-tetraethylammonium benzenephosphonate
(6) Trimethylsulfonium p-toluenesulfonate
(7) Methyltri-n-hexylammonium p-toluenesulfonate
(8) Benzyltrimethylammonium phosphate
(9) Benzyltrimethylammonium acetate
(10) Methyltri-n-butylammonium methosulfate
(11) Benzyltrimethylammonium benzoate
(12) Tetraethylammonium methanesulfonate
(13) Benzyltrimethylammonium 2-naphthalenesulfonate
(14) Bis-benzyltrimethylammonium m-benzene disulfonate
(15) Benzyltrimethylammonium thiocyanate
(16) Tetramethylammonium methosulfate Various other quaternary ammonium, tetraalkylphosphonium or trialkylsulfonium salts can be employed in the present process, e.g., the halides, sulfates, phosphates, phosphonates, acetates, and other carboxylic acid salts, benzoates, phosphonates, etc., specifically, for example, tetramethylammonium bromide, tetraethylammonium bromide, tetramethylammonium chloride, tetraalkylphosphonium chloride, tetraethylammonium phosphate, etc., and similarly the alkali, alkaline earth and other metal salts with the foregoing anions can be employed, e.g., sodium chloride, potassium phosphates, sodium acetate, calcium acetate, lithium benzoate, calcium chloride, rubidium bromide, magnesium chloride, as well as the sulfonic acid, particularly aromatic sulfonic acid, and alkylsulfuric acid salts of the foregoing cations and of other alkali, alkaline earth, rare earth and other metals, e.g., cesium, cerium, lanthanum, yttrium, particularly with anions to achieve sufficient water solubility. The aluminum cation is only somewhat inferior to sodium in respect to its discharge potential, but most salts of aluminum tend to hydrolyze in water and precipitate aluminum oxide. It is understood that the solutions designated herein as containing salts, electrolytes, etc., in specified amounts have reference to solutions containing salts sufficiently stable to remain in solution. It will be recognized that many cations are capable of existing in several valence states, and some valence states will be more suitable as supporting electrolytes than others. Other examples of salts which can be employed in the present process, although not necessarily with equivalent or optimum results, are barium bromide, barium acetate, barium propionate, barium adipate, cerium sulfate, cesium chloride, cesium benzoate, cesium benzenesulfonate, potassium oxalate, potassium sulfate, potassium ethyl sulfate, lanthanum acetate, lanthanum benzenesulfonate, sodium sulfate, sodium potassium sulfate, strontium acetate, rubidium sulfate, rubidium benzoate, trisodium phosphate, sodium hydrogen phosphate and sodium bicarbonate.

Solubility will to some extent set an upper limit on salt concentration in the electrolyte solution, although if considered on the basis of water solubility in the salt, fairly low concentrations of water can be employed, but in general there will be at least 2 or 3% or so by weight of water or other proton donor present and water will often constitute more than 15 or 20% by weight of the catholyte.

In conducting the electrolysis process batch-wise and on a laboratory scale, the following procedure and apparatus may be employed. The electrolytic cell will comprise a container of material capable of resisting the action of the electrolytes, e.g., glass. Within the container, and serving to divide it into an anode compartment and a cathode compartment may be a diaphragm in the form of a porous cup, e.g., of unglazed porcelain. The anode, which can be of, e.g., platinum or carbon, or any electrode which is inert under the reaction conditions, is immersed in an anolyte contained in the porous cup. The anolyte is an aqueous solution of the salt. When there is employed no diaphragm in the cell, stirring can be employed for pH control. Thereby the anode is subjected to little or no attack; so that the anode can be of substantially any electrode material. An anode comprising lead deposited on a copper screen can thus be employed. The cathode, which may be mercury, lead or another metal, and the porous cup, if one is employed, are submerged in the solution of unsaturated organic reactant in the concentrated aqueous salt or a mixture of the same with a polar solvent. The entire cell may be cooled by a jacket containing a coolant, and both the anode and cathode chambers may be equipped with condensers. However, as will be hereinafter shown, the increase of temperature which is produced during electrolysis generally does not result in so much of a decrease in yield that cooling other than with circulating water is economically required. Generally, the electrolysis can, for example, be conducted at a temperature of from, say, less than about 10° C., and up to almost the refluxing temperature of the electrolytic bath and at higher temperatures under pressure. Actually, slightly higher than ordinary ambient temperatures are conducive to improved yields, higher solubilities and lowered electrical resistance. This is to some extent counterbalanced by the tendency of some diaphragm material such as cationic membranes to deteriorate at elevated temperatures, say of 70° C., or the like and the tendency of some compounds to vaporize at higher temperatures. It is generally advantageous to operate in the range of about 40 to about 60° C. Stirring of the solution during the electrolyses, if desired, may be conducted by mechanical or magnetic means. During the electrolysis, the pH of the catholyte may be controlled as hereinbefore described. The quantity of current which is supplied to the cell will vary with the nature and quantity of the bath and of the electrodes and with the operating temperature, but will ordinarily be at a rate greater than 0.5 ampere and in the order of a current density of, say, from 2.0 to 20.0 or 40 or more amperes/dm.$^2$ (dm.$^2$ refers to the area in square decimeters of cathode surface). The efficiency of the process is, to some extent, dependent on the current density used.

EXAMPLE

A catholyte was prepared by mixing 30 grams benzal aniline, 30 grams tetraethylammonium p-toluenesulfonate, 110 ml. acrylonitrile and 10 ml. water and the catholyte was charged to an electrolysis cell. The cell was a glass receptacle containing 110 ml. mercury as cathode (about 55 sq. centimeter cathode). An Alundum cup was suspended to its top edge in the catholyte and provided with a 50% by weight solution of tetraethylammonium p-toluenesulfonate in water as anolyte, the cup serving as a diaphragm to divide the anolyte from the catholyte, and a platinum anode was immersed in the anolyte. Electrolysis was conducted utilizing a source of direct current at a cell voltage of about 20 to 40 volts at cathode voltages (vs. saturated calomel electrode) of about −1.49 volts. Electrolysis was conducted at about 1 to 1.5 amperes for a total of over 7 ampere-hours, while the temperature of the catholyte was maintained at 2 to 6° C. Acetic acid was added as necessary to control alkalinity and maintain the pH about neutral. The catholyte was extracted with methylene chloride, and 30.5 grams of material remained after volatilization of the methylene chloride. The material was dissolved in benzene, washed with 5% hydrochloric acid, then with water, dried over calcium sulfate and the benzene removed by distillation to obtain 27.2 grams syrup. Fractional distillation gave a small amount of material at 177–180° C./0.45–0.6 mm. which was redistilled at 146–150°/0.45–0.5 mm., and had a melting point at 115° C. The analysis and melting point (the same as reported by A. Pernot and A. Willemart, Bull. Soc. Chim. 1953, p. 324) (France), showed the compound to be 1,5-diphenyl-2-pyrrolidone. *Analysis.*—Calc'd: C, 80.98; H, 6.37; N, 5.90. Found: C, 80.70; H, 6.87; N, 6.05.

The product was confirmed by infrared spectrum showing a carbonyl group but no —CN or —NH groups, and by comparison with an authentic sample of the compound. The electrolysis product:

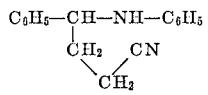

either underwent hydrolysis followed by ring closure at the carboxyl and amino groups, or underwent ring closure followed by hydrolysis of the imino group to the carbonyl.

The reductive cross-coupling of benzal aniline and ethyl acrylate can be conducted under the same conditions, care being taken to keep the temperature low and to avoid hydrolysis of the benzal aniline, and the product will generally cyclize as above to produce the same pyrrolidone.

Many of the compounds which can be prepared by the present process are known compounds having known properties and uses. The process is useful in obtaining various diamines by hydroimerizing azomethines containing substituents desired in the diamine compounds. The diamines will be useful alone or after reaction with aldehydes and the like as cloth or paper substantive materials for various finishing purposes, improving the hand thereof, dyeing properties and the like. Moreover the diamines will be useful for forming polyamide resins by condensation with dicarboxylic acids such as adipic acid and the like, the polyamide resins being useful in applications now employing nylon.. The cross-coupled reduction products of azomethines with activated olefins will be useful for various purposes. For example, those products containing nitrile or carboxyl functions can be cyclized to lactams, and such cyclization in some cases occurs during electrolysis or during the isolation procedures following the electrolysis, such as the production of a pyrrolidone in the example. Those products containing an amino group along with various other functional groups will be useful for various purposes requiring such combinations of such functional groups or as intermediates in various reactions involving such functional groups.

What is claimed is:

1. The method of obtaining reductively coupled compounds from azomethines which comprises subjecting a solution containing an azomethine and supporting electrolyte salt to electrolysis in contact with a cathode, causing development of the cathode potential necessary to effect reductive coupling, and causing coupling of the azomethine at the carbon atom of the double bond with attachment of hydrogen to the nitrogen atom of the double bond to thereby saturate the double bond and recovering the reductively coupled compound.

2. The method of claim 1 in which the solution comprises water, more than 10% by weight of azomethine and at least 5% by weight of electrolyte salt.

3. The method of claim 1 in which the catholyte is non-acidic.

4. The method of claim 1 in which the salt provides a cation discharging at cathode potentials substantially more negative than that at which the reductive coupling is effected.

5. The method of claim 1 in which the salt is selected from the group consisting of quaternary ammonium aromatic sulfonates and quaternary ammonium alkyl sulfates.

6. The method of claim 1 in which the azomethine is reductively cross-coupled with an $\alpha,\beta$-olefinic nitrile.

7. The method of claim 1 in which the azomethine is reductively cross-coupled with an alkyl acrylate.

8. The method of claim 1 in which benzal aniline is reductively cross-coupled with acrylonitrile with the coupling occurring between the $\beta$-carbon of the acrylonitrile and the carbon atom of the benzal aniline double bond.

9. The method of preparing hydrodimers of azomethines which comprises subjecting solution of an azomethine, water and quaternary ammonium salt to electrolysis in contact with a cathode, causing development of the cathode potential required to cause hydrodimerization, and causing coupling of the azomethine at the carbon atom of the double bond with reduction to produce a hydrodimer of the starting azomethine.

References Cited
UNITED STATES PATENTS

| | | | |
|---|---|---|---|
| 2,632,729 | 3/1953 | Woodman | 204—72 |
| 2,726,204 | 12/1955 | Park et al. | 204—72 |
| 3,140,276 | 7/1964 | Forster | 204—59 |

JOHN H. MACK, *Primary Examiner.*

H. M. FLOURNOY, *Asssistant Examiner.*